Dec. 15, 1959     C. F. WHITMORE     2,916,892
AIR CONDITIONING SYSTEM CONTROLS
Filed Sept. 27, 1956
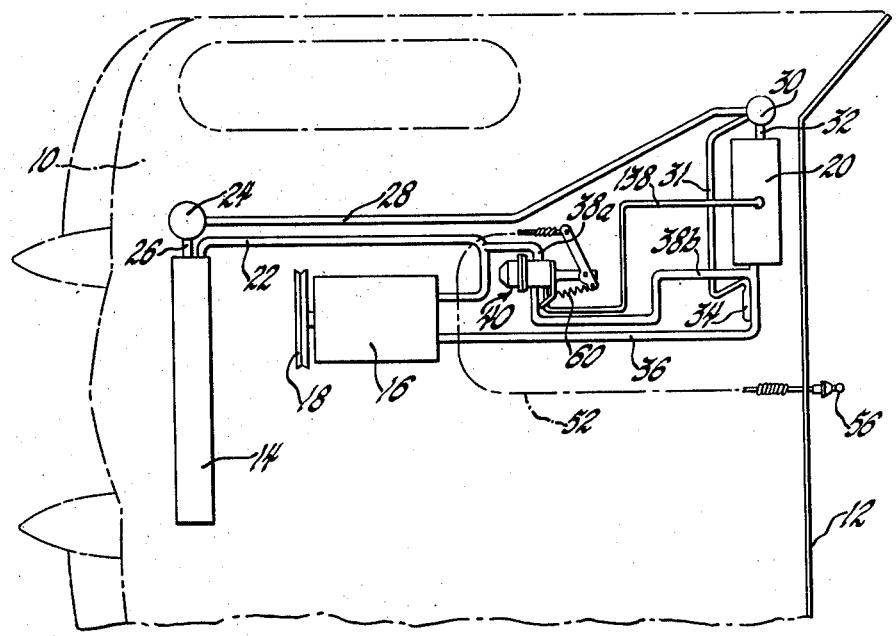
INVENTOR.
Charles F. Whitmore
BY
J. W. Lovett
ATTORNEY

United States Patent Office 2,916,892
Patented Dec. 15, 1959

2,916,892

AIR CONDITIONING SYSTEM CONTROLS

Charles F. Whitmore, Newfane, N.Y., assignor to General Motors Corporation, Detroit, Mich., a corporation of Delaware Application September 27, 1956, Serial No. 612,525

3 Claims. (Cl. 62—161)

This invention relates to air conditioning and more particularly to controls for air conditioning systems.

Difficulties have been experienced in applying air conditioning systems to use in automobiles in that extreme variations in conditions are encountered. One system of control has been disclosed in the United States application for Letters Patent Serial No. 570,201, filed March 7, 1956, in the names of Holmes, Mandy and Taylor and entitled "Air Conditioning Systems." Such a system utilizes a by-pass valve returning refrigerant from the high pressure side of a compressor to the upstream side of a thermostatic bulb to mix with the discharged vapors of the evaporator. At high vehicle speeds and without such a by-pass valve, the temperature and pressure within the evaporator may drop excessively. The valve operates to maintain the evaporator pressure above a predetermined setting such as thirty pounds per square inch and thereby avoid freezing of the evaporator and lowering of its effectiveness. Such valve control of the system has been satisfactory in many installations but in some cases performance has been erratic.

An object of the present invention is to provide an improved air conditioning system in which a compressor may operate at various speeds wthout freezing of the evaporator. Another object is to provide an air conditioning system for an automobile in which system a refrigerant compressor may be driven at speeds out of proportion to the demand imposed on the system and in which the evaporator pressure is automatically maintained despite conditions heretofore causing variations in that pressure under certain conditions.

To these ends, a feature of the invention pertains to an air conditioning system utilizing an evaporator by-pass valve controlled by the pressure in the evaporator as conveyed by an equalizer line.

These and other important features of the invention will now be described in detail in the specification and then pointed out more particularly in the appended claims.

In the drawings:

Fig. 1 is a phantom view of the forward right-hand portion of an automobile with a diagrammatic representation of an air conditioning system installed thereon; and Fig. 2 is an enlarged sectional view of a by-pass valve shown in the system of Fig. 1.

As stated heretofore, the control system disclosed in the application Serial No. 570,201 has been found satisfactory, but in some cases erratic performance of the air conditioning system using such a control has been noted. A considerable study and investigation of the situation has resulted in the conclusion that, if the by-pass valve is any substantial distance away from the evaporator, the by-pass valve, used as taught in the patent applicattion, is operated subject to the pressure of the refrigerant in the refrigerant flow line connecting the valve and the evaporator instead of to the true pressure in the evaporator itself. In other words, the evaporator in some instances would be controlled by some relative pressure in another part of the system. This by itself would not be a serious difficulty if the relative pressure difference (between the pressure in the by-pass line and the pressure in the evaporator) was constant. When used in an automobile, the pressure difference referred to is affected by pressure drop along the by-pass line which in turn is affected by ambient temperature and car speed variations or fluctuations.

By experiments, it has now been found that if a separate equalizer line were utilized to connect the pilot portion of the by-pass valve directly to the evaporator, the control of the system would be much improved. Such an equalizer line should be and is free of the refrigerant flow through the system as it may extend from the evaporator to a dead-end chamber in the by-pass valve. With no flow of fluid in the equalizer line leading to the by-pass valve, there is no fluctuating pressure drop in that line disturbing the by-pass valve control. It is with this improved control, including the independent equalizer line, that the present invention is concerned.

An automobile 10 is shown in Fig. 1 in which an air conditioning system is installed forward of a fire wall 12 separating the engine compartment from the passenger compartment. As is conventional, a condenser 14 is installed immediately forward of the radiator and a compressor 16 is mounted in the engine compartment to be driven from the crankshaft of the engine by means of a pulley 18. With a direct drive from the engine, the compressor 16 will operate over a great range of speed, i.e. the faster the car is driven, the greater r.p.m. imparted to the compressor. Immediately forward of the fire wall 12 is placed an evaporator 20.

The compressor 16 is connected to the condenser 14 by a high pressure conduit 22 and the cooled liquid refrigerant is conducted from the condenser by means of a line 26 to a receiver 24. The liquid is conveyed from the receiver by a conduit 28 to an expansion valve 30 and then by way of a short conduit 32 to the evaporator 20.

The expansion valve 30 is arranged to be controlled by a thermostatic element or a bulb 34 arranged in heat exchange relation with a line 36 leading from the discharge side of the evaporator to the compressor 16. The valve 30 is connected to the bulb 34 by a line 31. Bulb control of an expansion valve is conventional and one form thereof is disclosed in the United States Patent 1,987,948, granted January 15, 1935, in the name of L. C. Smith. A by-pass line with two portions 38a and 38b connects the high pressure conduit 22 to the discharge side of the evaporator 20. Portion 38a of the by-pass line serves to admit high pressure refrigerant to a by-pass valve 40. The other side of the valve 40 is connected by the portion 38b of the by-pass line to the discharge side of the evaporator upstream from the bulb 34.

The by-pass valve 40 is provided with a lever 44 pivoted at 46 near one end of a cylindrical member 48 forming part of the valve 40. One end of the lever 44 is pivotally connected as at 50 to one end of a Bowden wire 52 guided by a conduit 54 to a push-pull knob 56 mounted within the passenger compartment and easily accessible to the vehicle operator.

The other end of the lever 44 is apertured as at 58 to receive one end of a coil spring 60. The other end of the spring 60 is hooked around a finger 62 integral with a supporting plate 64 for the valve 40. The latter has a main body 70 which is supported on the plate 64 by means of screws 72.

Interposed between one side of the plate 64 and the main body 70 is a flexible diaphragm 74. The stem 76 of a pilot valve 78 abuts the central portion of the diaphragm 74. A member 80 is fixed to the diaphragm on the side opposite the valve 78 to enter and retain one end of a coil spring 82 which is enclosed within a chamber 84 formed in the projection 48. The member 80 bears an integral disk 86 contacting the diaphragm 74. A block 88 is fixed by means not shown within the axial chamber 84 slidably to receive a stem 90 of a spring retaining member 92. This member extends within one end of the coil spring 82. Fixed to the end of the stem 90 is a nylon disk 94 which is arranged to approach a shoulder 96 formed in the projection 48 when the spring 82 is further compressed, as will further appear.

The lever 44 bears a curved cam portion 100 which may be moved against the end of the nylon disk 94. As this portion is not concentric in its curvature with the pin 46, it may be utilized to compress the spring 82 when the lever 44 is swung clockwise as viewed in Fig. 2.

The valve body 70 is provided with a threaded inlet port 102 adapted to be connected to the high pressure line portion 38a leading from the compressor. The body is also provided with an outlet port 104 connected to the low pressure line 38b leading to the discharge side of the evaporator between the latter and the bulb 34. The ports 102 and 104 are in offset relation with a cylinder 106 formed in the body 70 and flow from the port 102 through the cylinder 106 to the port 104 is controlled by a cylindrical valve member 108 which is reciprocable in the cylinder and which is attached to the center of a main valve diaphragm 110 by means of a screw 112. The valve 108 may be termed a "preset" valve and is slidable in a block 109 fixed within an enlarged portion of the cylinder 106. A plate 114 is interposed between the diaphragm 110 and the head of the screw, and the latter has an axial passage 113 connected with an oblique passage 115 formed in the valve 108. The valve body 70 is recessed at opposite ends as at 116 and 118 to permit movement of the diaphragms 110 and 74, respectively. The margin of the diaphragm 110 is held to the body 70 by being interposed between the latter and a circular flange 120 formed on a cup member 122. Screws 124 are used to maintain this relation. The bottom end of the cup 122 is formed with a flat interior surface 126 against which one end of a coil spring 128 rests. The other end of the spring surrounds the head of the screw 112 and bears against the plate 114.

The pilot valve stem 76 slides in a cylinder block 130 fixed to the body 70 and closing one end of the cylinder 106. This block has a chamber adapted to be closed off by the valve 78 and also has a port communicating with a passage 134 in the body 70 leading to the recess 116. The body 70 also has a passage 136 ported as at 137 for connection with one end of an equalizer line 138. The other end of this line is connected to an upper portion of the evaporator 20. A spring 135 is inserted between the two valves 78 and 108.

In operation of the system the flow of liquid refrigerant through the lines 28 and 32 to the evaporator 20 is controlled by the expansion valve 30 which in turn is controlled by the bulb 34 as is conventional. This control prevents a pressure build-up in the evaporator because discharged refrigerant from the latter extracts heat from the bulb 34 and causes the expansion valve 30 to act accordingly. If the bulb 34 were relied upon completely for controlling the expansion valve 30, there would be danger of ice formation on the evaporator under certain conditions, as heretofore stated.

By utilizing the by-pass valve 40 and the equalizer line 138 of the present invention, this freezing of the evaporator is prevented. If the preset valve 108 is caused to open because of an undue drop in the pressure of the evaporator, heated refrigerant vapor will pass through the by-pass valve 40 and will be conveyed to the outlet of the evaporator to influence the bulb 34 and actuate the thermostatic valve. This will raise the pressure in the evaporator above the minimum required for non-freezing operation. This assures reasonable temperature in the compressor 16 and also a maximum evaporator capacity at all times, and no uncertainty arises as the equalizer line 138 has no flow within it. The actual evaporator pressure thereby serves to control the by-pass valve 40.

Too low pressures and excessive compressor temperatures are simultaneously avoided because of the introduction of the hot by-pass vapor upstream from the bulb 34 and relief of the load on the compressor.

In carrying out the present invention, the valve 40 and its connections may be varied in arrangement and structural details; but the arrangement should be such that the equalizer line 138 is maintained free of the flow of refrigerant through the system and subject solely to the evaporator pressure. Assuming that the desired evaporator pressure is thirty pounds per square inch in a given installation, the valve 40 is so made and adjusted that the evaporator pressure exerted on the diaphragm 110 by way of the passages 115 and 113 maintains the valve 108 in such position as normally to maintain that preset evaporator pressure.

If, however, the evaporator pressure drops unduly or below the "preset" setting, the reduction of the pressure on the diaphragm 74 permits the spring 82 to expand thereby opening the valve 78. This allows pressure from the compressor to move the main diaphragm 110 and the valve 108 so that heated vapor will pass by the valve 108 into the by-pass line portion 38b. These valves automatically position to permit sufficient flow of heated vapor to maintain the desired setting.

If a higher air discharge temperature from the evaporator or less air cooling is desired, the knob 56 may be pulled to rotate the lever with a resultant opening of the pilot valve 78. This changed setting of the valve 40 will give a higher pressure in the evaporator.

The purpose of the spring 60 is merely to minimize the effort required in actuating the Bowden wire 52, and the spring 134 serves to return the pilot valve 78 to its closed position.

The pilot valve 78 quickly and accurately senses any variation in the true evaporator pressure with the result that the main by-pass valve 108, as well as the expansion valve 30, is quickly influenced properly to control the system.

I claim:

1. An air conditioning system comprising a compressor, condenser and evaporator connected in series for the circulatory flow of refrigerant, an expansion valve arranged to admit said refrigerant to said evaporator, thermostatic means responsive to the refrigerant discharge temperature of said evaporator and arranged to control said expansion valve, a line in said system by-passing said expansion valve and evaporator and connected to the discharge side of the latter upstream from said thermostatic means for discharging compressed refrigerant to affect the latter, a by-pass valve in said by-pass line controlled by a pilot valve portion, and an equalizer line connecting said evaporator with said pilot valve portion to operate the latter in accordance with pressure in the evaporator.

2. An air conditioning system comprising a compressor, condenser and evaporator connected in series for the circulatory flow of refrigerant, an expansion valve arranged to admit said refrigerant to said evaporator, thermostatic means responsive to the refrigerant discharge temperature of said evaporator and arranged to control said expansion valve, a line by-passing said expansion valve and evaporator with one end connected to the discharge side of said compressor and the other connected upstream from said thermostatic means, a by-pass valve controlling the flow in said by-pass line, a pilot valve portion in said by-pass valve, a pressure equalizer line free of refrigerant flow and directly connecting said pilot valve portion with said evaporator, and the arrangement being such that heated refrigerant may flow through said by-pass line to the discharge side of said evaporator and prevent freeze-up of the latter.

3. An air conditioning system suitable for use in an automotive vehicle, said system comprising a compressor, condenser and evaporator connected in closed series for the circulatory flow of refrigerant, an expansion valve in said system for admitting refrigerant from said condenser into said evaporator, thermostatic means associated with a discharge line for said flow connecting said evaporator to said compressor and responsive to the evaporator refrigerant discharge temperature, said expansion valve being under the control of said thermostatic means, a bypass line leading from the high pressure side of said compressor to said evaporator discharge line upstream of said thermostatic means, a bypass valve arrangement in said bypass line and including a preset valve and a supplemental valve, said preset valve being operable by pressure in said bypass line to give normal control of said expansion valve by admitting high pressure refrigerant to said evaporator discharge line for affecting said thermostatic means, a separate line independent of said flow connecting said supplemental valve to said evaporator, and said supplemental valve being operable by pressure in said separate line for modifying the operation of said preset valve to prevent evaporator freeze-up during abnormal conditions.

References Cited in the file of this patent

UNITED STATES PATENTS

| | | |
|---|---|---|
| 2,191,102 | Zerk et al. | Feb. 20, 1940 |
| 2,311,622 | Alexander et al. | Feb. 23, 1943 |
| 2,344,215 | Soling et al. | Mar. 14, 1944 |
| 2,715,992 | Wilson | Aug. 23, 1955 |
| 2,774,219 | Kelley | Dec. 18, 1956 |